(12) United States Patent
Liu et al.

(10) Patent No.: US 8,073,043 B2
(45) Date of Patent: Dec. 6, 2011

(54) METHOD FOR RELIABLE INJECTION OF DETERMINISTIC JITTER FOR HIGH SPEED TRANSCEIVER SIMULATION

(75) Inventors: Xin Liu, Shanghai (CN); Liang Zhang, Shanghai (CN); Jiang Li Xin, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 995 days.

(21) Appl. No.: 11/904,687

(22) Filed: Sep. 27, 2007

(65) Prior Publication Data

US 2009/0086801 A1  Apr. 2, 2009

(51) Int. Cl.
*H04B 3/46* (2006.01)
*H04L 7/00* (2006.01)
*G06F 1/04* (2006.01)

(52) U.S. Cl. .................. 375/226; 375/371; 713/503

(58) Field of Classification Search .................. 375/226, 375/326, 371, 373; 702/69; 713/503
See application file for complete search history.

(56) References Cited

U.S. PATENT DOCUMENTS

| | | | |
|---|---|---|---|
| 6,735,160 B1 * | 5/2004 | Miyashita et al. | 369/59.12 |
| 7,388,937 B1 * | 6/2008 | Rodger et al. | 375/348 |
| 2006/0100801 A1 * | 5/2006 | Tabatabaei et al. | 702/69 |
| 2006/0291548 A1 * | 12/2006 | Mattes et al. | 375/226 |
| 2010/0026314 A1 * | 2/2010 | Schuttert | 324/555 |

* cited by examiner

*Primary Examiner* — Young T. Tse
(74) *Attorney, Agent, or Firm* — Haynes and Boone LLP

(57) ABSTRACT

A method and a corresponding system for characterizing the performance of a clock and data recovery circuit in a digital transceiver is presented. The method comprises phase modulating a jitter-free data signal by a testing signal having added data jitter and measuring the time the clock and data recovery system takes to achieve bit lock of a phase modulated signal. Data uncorrelated timing jitter corresponding to a user defined probability distribution is included in the jitter testing signal. Utilization of a variable probability distribution in generating data uncorrelated timing jitter, as provided by the present invention, allows for greater flexibility and accuracy in clock and data recovery circuit testing and characterization.

11 Claims, 5 Drawing Sheets

METHOD FOR RELIABLE INJECTION OF DETERMINISTIC JITTER FOR HIGH SPEED TRANSCEIVER SIMULATION

BACKGROUND

1. Field of the Invention

The present invention relates generally to data communication networks and, more specifically, to a method and system for testing the bit lock performance of a clock and data recovery circuit.

2. Discussion of Related Art

Timing jitter is an important parameter in characterizing the performance of digital systems. In a digital system, timing jitter represents the difference between the time an edge event occurs and the ideal edge time of the event. The presence of timing jitter in a reference clock signal often translates directly into output data jitter within digital transceiver systems. Accordingly, as new designs implement increasing data transfer speeds, precise timing accuracy proves critical to the link performance of digital transceiver systems.

Timing jitter in a digital system may include random jitter ("RJ") and deterministic jitter ("DJ"). RJ is a component of timing jitter that is unbounded in amplitude and typically modeled by a Gaussian probability distribution. Thermal noise within the electrical circuit is often the primary cause of RJ. DJ is a component of timing jitter that is bounded in amplitude and predictable in nature. DJ may comprise multiple types of timing jitter, including data-dependent jitter ("DDJ"), sinusoidal jitter ("SJ"), and data-uncorrelated jitter ("DUJ"). DDJ comprises any DJ that correlates with data edge transitions, and often occurs when data edge transitions are distorted by limited data path bandwidth. SJ is periodic in nature and can be attributed to signal crosstalk. Finally, DUJ corresponds to DJ which does not correlate with data edge transitions.

The presence of timing jitter in a digital system is detrimental to overall system performance. Specifically, timing jitter may result in a reduction of digital signal eye openings and an increase of the overall bit error ratio ("BER") of the transceiver system due to narrowing of the signal's effective sampling window. FIG. 1 illustrates the relationship between timing jitter and BER in a serial transceiver link 100. Two ideal digital pulses 104 without data jitter are shown centered one unit interval ("UI") 108 apart. A distribution function 102 is shown illustrating the probability distribution of digital pulses having timing jitter. Increased timing jitter corresponds with increased data signal eye closure 106, 112 and a reduction in the overall eye opening 110. As increased eye closure reduces the effective sampling window of the data signal, it becomes crucial to perform careful analysis of a high-speed serial transceiver system's response to timing jitter, especially with respect to the transceiver's clock and data recovery ("CDR") circuit.

Therefore, in light of the foregoing description, it is desirable to provide a method and system for efficient and accurate testing and characterization of a CDR system's ability to operate in the presence of jitter.

SUMMARY

In accordance with some embodiments of the present invention, a method of testing a clock and data recovery circuit comprises generating a jitter signal including data-uncorrelated jitter having a defined probability distribution, generating a jitter-free data signal, phase modulating the jitter-free data signal by the jitter signal, and measuring the time the clock and data recovery system takes to achieve bit lock of the phase modulated signal.

In accordance with some embodiments of the present invention, a system for testing a CDR circuit comprises a data signal generator configured to generate a jitter-free data signal; one or more noise signal generators configured to generate a jitter data signal; a phase modulator in communication with the data signal generator, the CDR circuit and the one or more noise signal generators; a test signal output from the CDR circuit; a test signal input to the CDR circuit; and a detector system in communication with the data signal generator and the CDR circuit, configured to measure a bit lock acquisition time of the clock and data recovery circuit by using the jitter-free data signal and the test signal output; wherein one of the noise signal generator generates data-uncorrelated jitter having a defined probability distribution, and wherein the phase modulator modulates the jitter-free data signal by the jitter data signal to generate the test signal input.

Further embodiments and aspects of the invention are discussed with respect to the following figures, which are incorporated in and constitute a part of this specification.

In the figures, elements having the same designation have the same or similar functions.

DESCRIPTION OF THE EMBODIMENTS

A CDR circuit may have multiple operating modes that depend on the state of the data contained in the digital stream received by the transceiver system. For example, a CDR circuit may operate in a mode during which an internal CDR sampling clock is aligned to a reference clock signal embedded within rich data transitions in the incoming data stream (i.e., a training mode). The rich data transitions may, for example, correspond to a periodic binary data pattern (e.g., a repetitive series of bit patterns such as 1010 . . . ). The process of aligning the internal CDR sampling clock to the embedded reference clock is called bit lock acquisition, and is often limited to a specific time duration as required by the transceiver specification.

Once bit lock has been obtained, the CDR circuit often switches to an operating mode during which the CDR circuit tracks minor phase changes in the timing of the received digital data stream (i.e., payload data tracking). The CDR circuit's tracking sensitivity (measured in terms of tracking error) is typically set by transceiver specification requirements. In addition, the CDR circuit's timing jitter tolerance is also commonly defined by specification requirements.

The effects of DJ on the transceiver system may vary depending on the current operating mode of the CDR circuit. For example, during the CDR training mode, DUJ and SJ are the predominate types of DJ. DDJ effects are minimal in this mode, as the periodic data patterns of the digital stream utilized in training are not particularly susceptible to DDJ. During signal tracking of payload data, DDJ becomes a more prevalent form of DJ. However, as DDJ effects are limited in nature, most transceiver system specifications have requirements defining primarily maximum allowable DUJ and SJ effects.

As jitter requirements are typically defined in a system's specification, a CDR circuit designer must account for jitter effects in an implemented CDR circuit design. Accordingly, accurate testing and modeling of jitter effects proves essential to effective CDR circuit design. Testing of a CDR circuit's response to timing jitter is performed by injecting timing jitter into a testing data stream and subsequently measuring the response of the CDR circuit during training and tracking modes with respect to the testing data stream.

Figure 1:
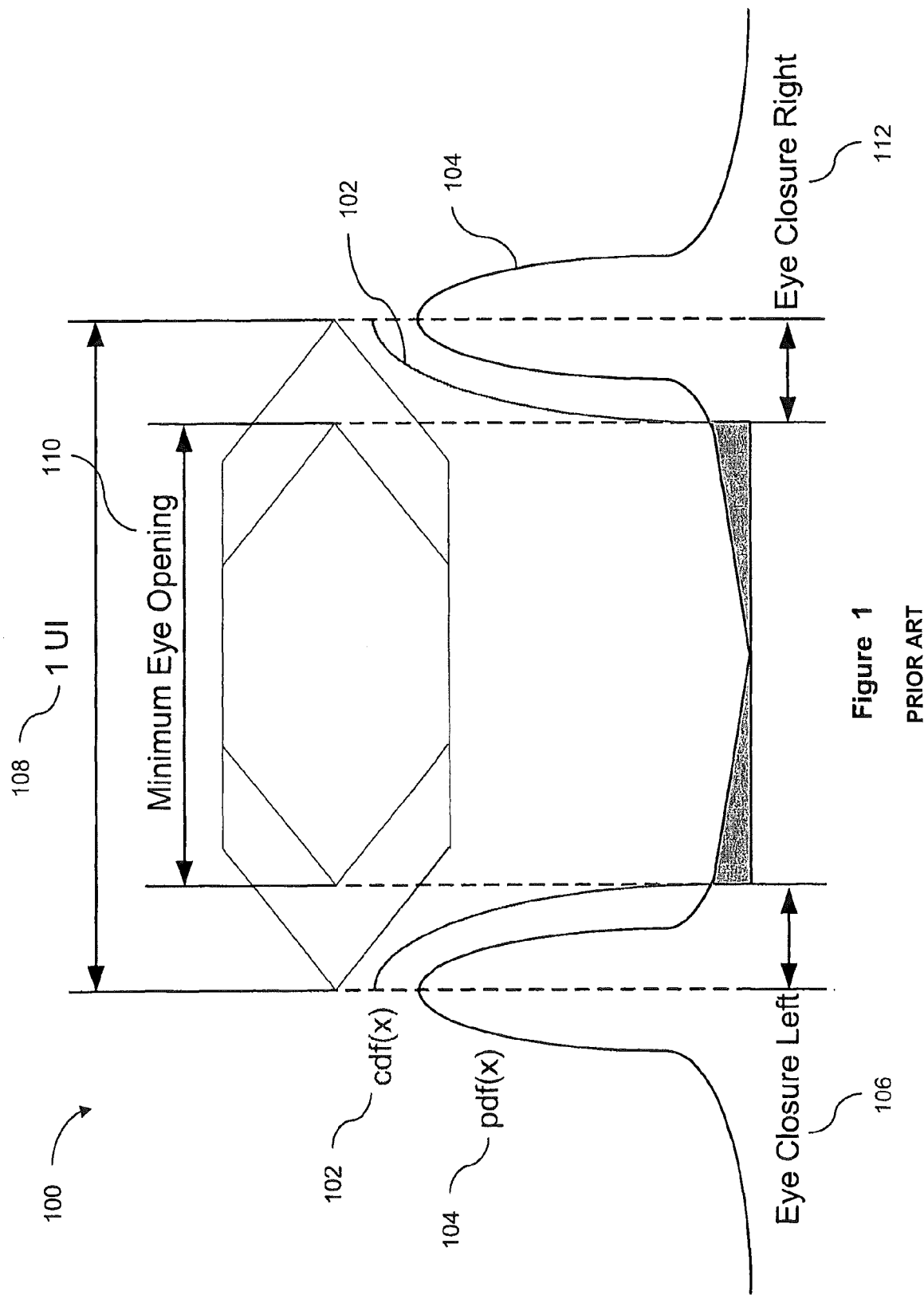
FIG. 1 is an illustration showing the relationship between timing jitter and BER in a serial transceiver link.
Figure 2:
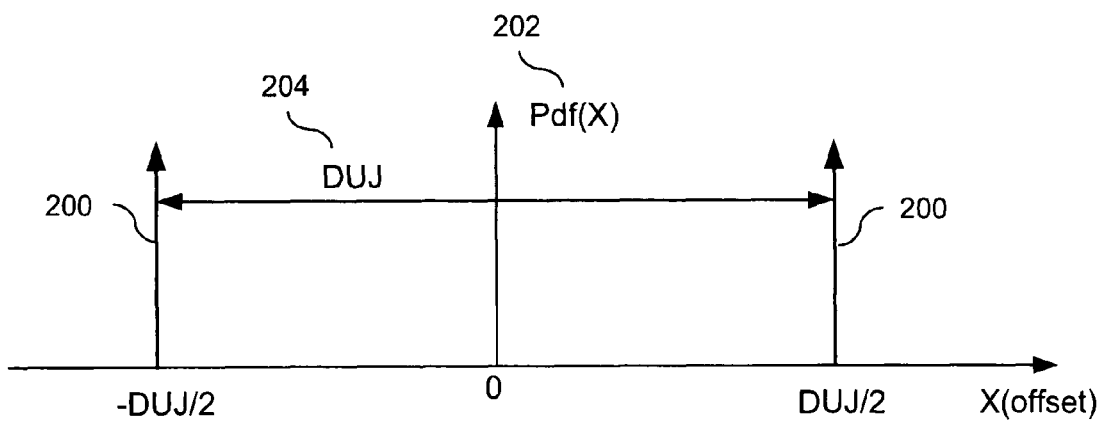
FIG. 2 is an illustration of a dual-Dirac probability distribution used to model DUJ in CDR system testing.
Figure 3:
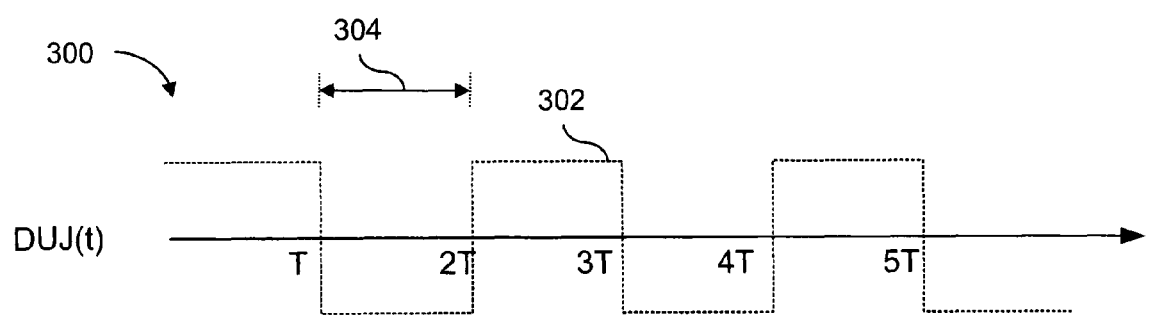
FIG. 3 is an illustration of DUJ corresponding to a dual-Dirac probability distribution model.

DUJ can be modeled in CDR circuit jitter response testing according to a dual-Dirac probability distribution 202 as illustrated in FIG. 2. The dual-Dirac probability distribution 202 is defined by two Dirac-delta functions 200 spaced at a distance 204 corresponding to the maximum DUJ swing. FIG. 3 illustrates a plot 300 of the magnitude of generated DUJ 302 according to a dual-Dirac probability distribution 204. As illustrated, the DUJ switches from maximum to minimum magnitudes alternatively between adjacent bit intervals 304 of duration T.

While widely used, the dual-Dirac model of DUJ presents several issues. The large cycle-to-cycle swing of dual-Dirac modeled DUJ can create oscillations within the feedback loop of the CDR, thereby artificially increasing the bit lock acquisition time of the CDR system. In addition, dual-Dirac modeled DUJ does not correlate well with actual measured DUJ. Accordingly, use of dual-Dirac modeled DUJ during CDR testing can lead to mischaracterization of the CDR circuit's response to actual timing jitter.

In accordance some embodiments of the present invention, a method and a corresponding system for characterizing the performance of a clock and data recovery circuit in a digital transceiver is presented. Specifically, in accordance with at least one embodiment of the invention, the method comprises phase modulating a jitter-free data signal by a testing signal having added data jitter and measuring the time the CDR system takes to achieve bit lock of a phase modulated signal. The added data jitter includes DUJ having a user defined probability distribution. The jitter-free data signal may include periodic data patterns used to train a CDR system's internal sampling clock signal to a reference clock signal embedded within the periodic data patterns contained in the jitter-free data signal. In addition, the added data jitter may also include random jitter and sinusoidal jitter having specified probability distributions and frequency ranges.

In accordance with some embodiments of the present invention, a system for testing a CDR includes a data signal generator, one or more noise signal generators, a phase modulator, and a detector system. At least one of the noise signal generators is configured to generate DUJ having a user defined probability distribution. The phase modulator modulates a jitter-free data signal received from the data signal generator by jitter signals generated by the noise signal generators. In at least one embodiment of the invention, the jitter-free data signal includes periodic data patterns. In addition to DUJ, the jitter signals generated by the noise signal generators may also include RJ and SJ components. The phase modulated signal is sent to a CDR circuit, and the corresponding bit lock time of the CDR with respect to the modulated signal is measured by the detector system.

In some embodiments, a user defined probability distribution is utilized to model DUJ and accurate testing and characterization of CDR circuit and transceiver system performance may be achieved.

Figure 4:
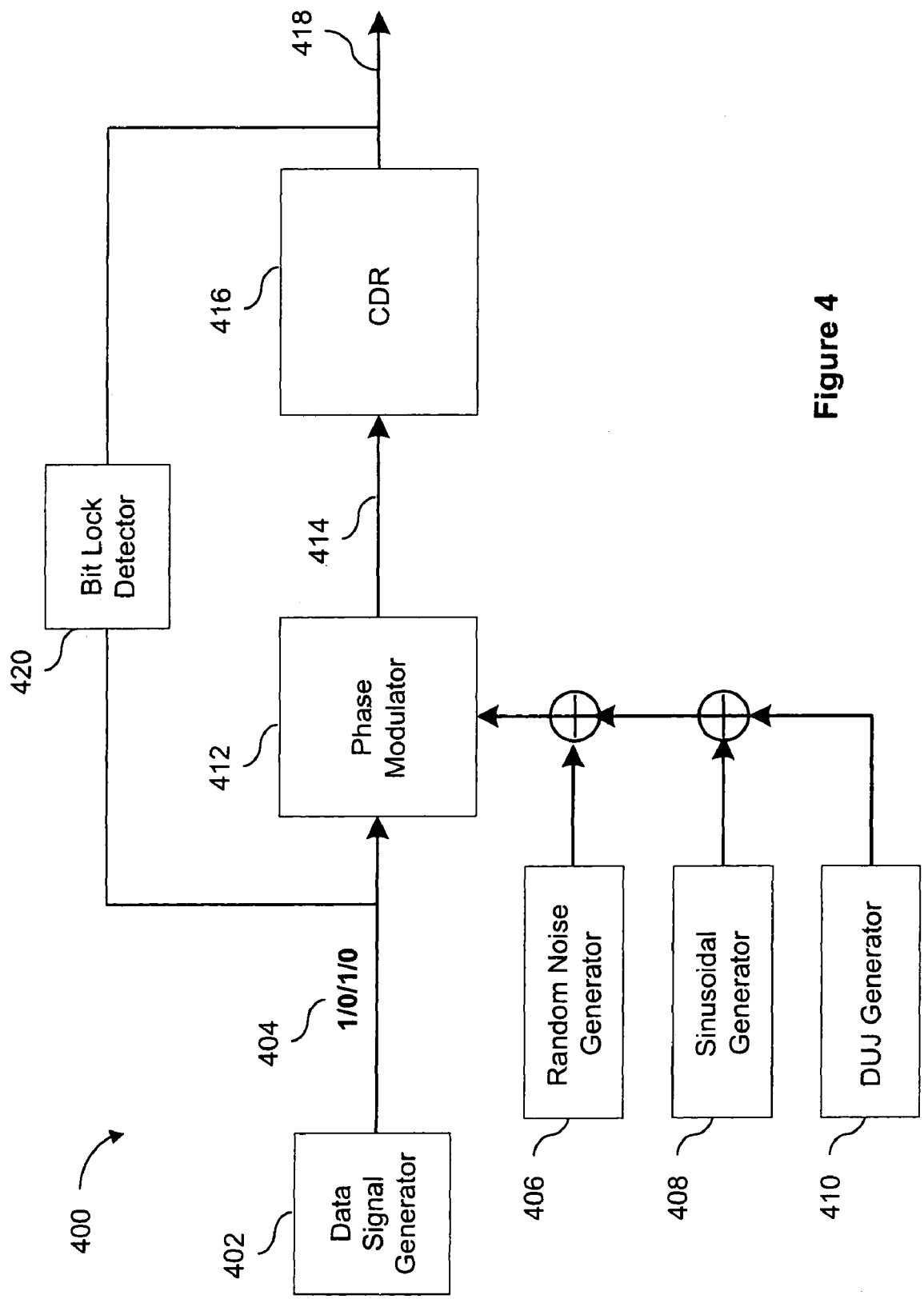
FIG. 4 illustrates a testing system according to some embodiments of the present invention.

FIG. 4 is a block diagram illustrating some embodiments of the present invention. CDR testing system 400 as illustrated comprises a data signal generator 402 configured to generate a jitter-free data signal 404, one or more noise signal generators 406-410, a phase modulator 412, and a detector system 420 in communication with the data signal generator 402 and the output 418 of a CDR system 416.

CDR circuit 416 receives an input signal from phase modulator 412 and provides an output signal 418. Data signal generator 402 generates a jitter-free data signal 404. The jitter-free data signal may, for example, include a periodic binary data pattern (e.g., a repetitive series such as 1010 . . . ), as illustrated. The periodic binary data patterns contained in jitter-free data signal 404 may define an embedded reference clock signal used to train an internal sampling clock of CDR circuit 416.

DUJ generator 410 is configured to generate DUJ corresponding to a user defined probability distribution. DUJ generator 410 may be configured to generate DUJ with a magnitude defined in terms of a percentage of the unit interval (e.g., 0.18 UI) of a reference clock signal embedded in jitter-free data stream 404. In some embodiments, a pseudo random binary sequence ("PRBS") generator may be configured to generate a DUJ signal having a user defined uniform probability distribution.

CDR testing system 400 may also include random noise signal generator 406. Random noise generator 406 can, for example, be configured to generate RJ noise. Random noise generator 406 may, for example, generate RJ noise corresponding to a Gaussian probability distribution. The probability distribution of the generated RJ noise may be determined by specified mean (e.g., mean value of 0) and standard deviation values. The standard deviation of the RJ noise may be defined in terms of a percentage of the unit interval of a reference clock signal embedded within the jitter-free data stream 404 (e.g., standard deviation of 0.2 UI).

CDR testing system 400 may further include a sinusoidal noise generator 408 configured to generate a SJ noise signal. Sinusoidal noise generator 408 may be further configured to generate a SJ noise signal corresponding to a specific frequency range (e.g, 200 kHz to 10 MHz) with a magnitude defined in terms of a percentage of the unit interval (e.g., 0.05 UI) of a reference clock signal embedded in jitter-free data stream 404.

Phase modulator 412 modulates the jitter-free data signal 404 by the combinative jitter signals of noise signal generators 406-410, generating modulated signal 414 with added timing jitter.

CDR circuit 416 aligns an internal sampling clock with a clock signal embedded within the data transitions of the data signal 414 having added data jitter. The time required to align the internal sampling clock of the CDR circuit 416 to the data signal with jitter 414 (i.e., bit lock time) is measured by bit lock detector 420 in communication with the jitter-free data signal 404 and the output 418 of the CDR circuit 416. The measured bit lock time may be compared with the transceiver system specification to determine whether CDR circuit 416 meets design requirements.

Figure 5:
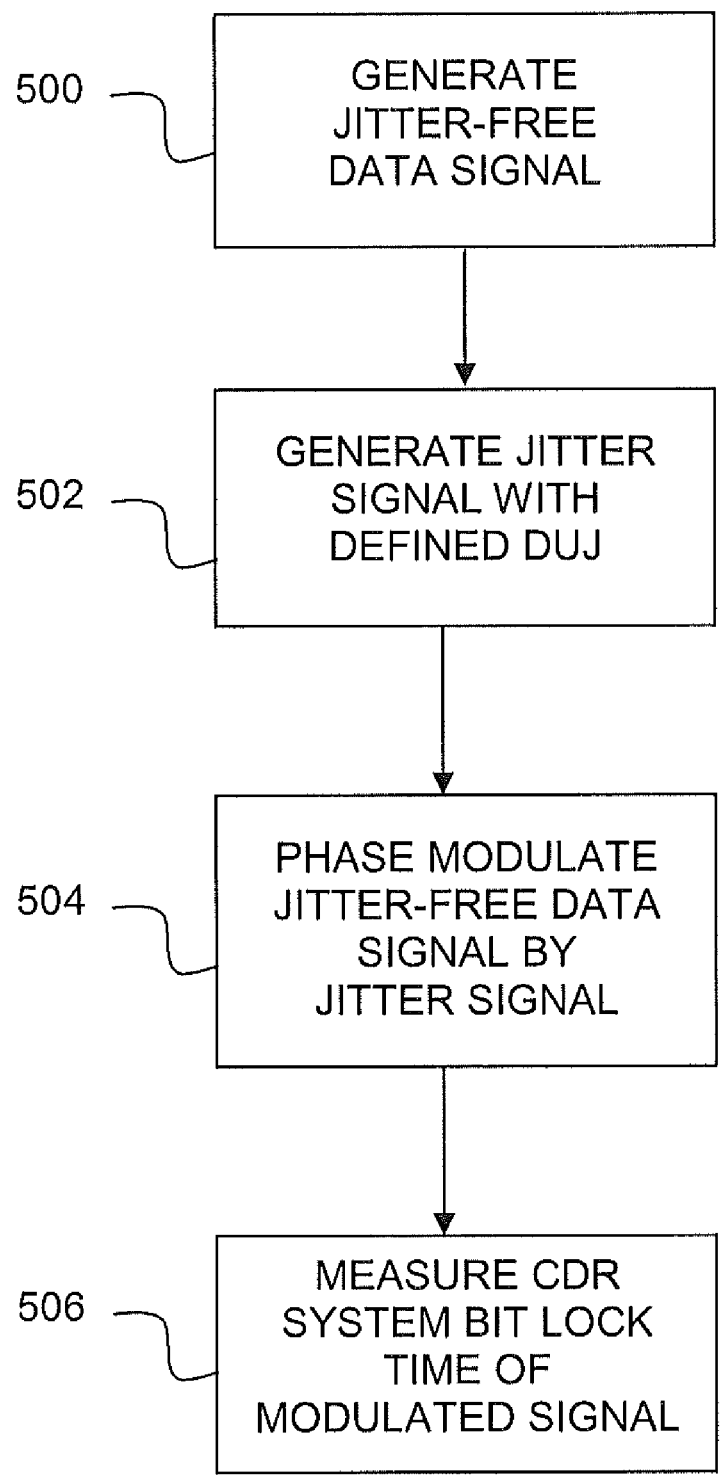
FIG. 5 shows a flow chart illustrating a CDR testing method according to some embodiments of the present invention.

FIG. 5 is a flow chart illustrating a CDR testing method according to some embodiments of the present invention. Data signal generator 402 generates a jitter-free data signal 500. Generators 406-410 generate a jitter signal in step 502, including data-uncorrelated jitter following a defined probability distribution. The jitter-free data signal is phase modulated in step 504 by the jitter signal. The phase modulated signal is fed to a CDR test circuit 416, and the bit-lock acquisition time of the tested CDR circuit 416 is measured in step 506.

Figure 6:
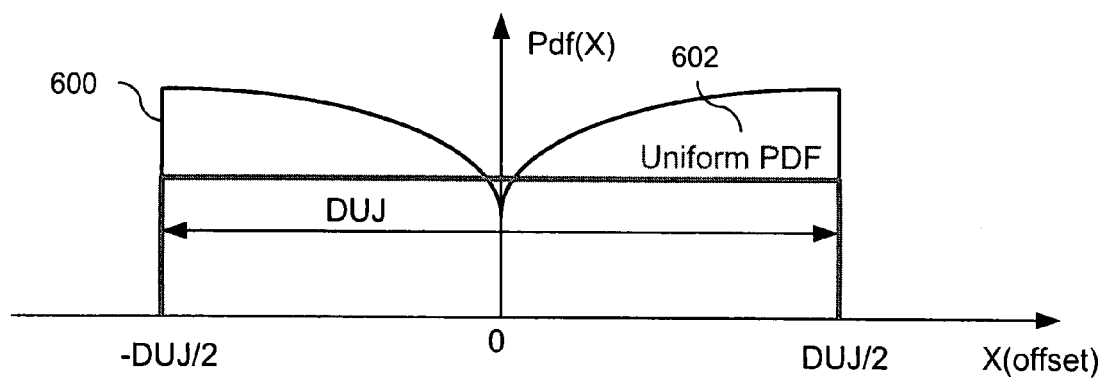
FIG. 6 is an illustration of two generated user defined probability distributions which may be used to model DUJ by generating a corresponding DUJ signal according to some embodiments of the present invention.

FIG. 6 is an illustration of two user defined probability distributions 600-602 which may be used to model DUJ by generating corresponding DUJ signals according to at least one embodiment of the present invention. User defined probability distributions 600-602 may be determined by, for example, measuring actual DUJ distributions in implemented transceiver systems. A digital data signal corresponding to uniform probability distribution 602 may be generated, for example, by a PRBS generator. A digital data signal corresponding to probability distribution 600 may be generated, for example, by a digital sequence generator configured to generate an output data stream having values which follow probability distribution 600.

Figure 7:
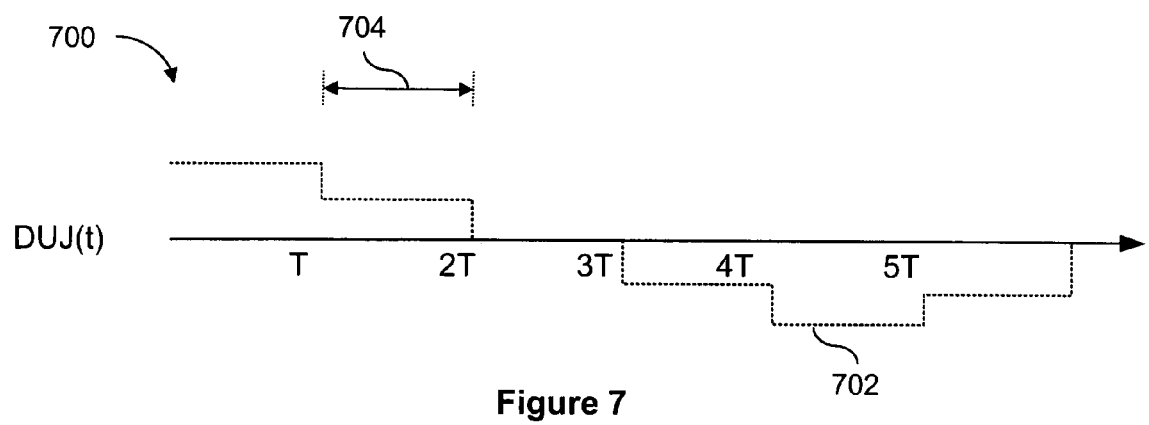
FIG. 7 is an illustration of generated DUJ corresponding to a user defined probability distribution according to some embodiments of the present invention.

FIG. 7 illustrates a plot 700 of the magnitude of generated DUJ 702 corresponding to a user defined probability distribution according to at least one embodiment of the invention. As illustrated, generated DUJ 702 corresponds to a user defined uniform probability distribution 602 model. The DUJ magnitude change between adjacent bit intervals 704 corresponding with user defined uniform probability distribution 602 is significantly less than the DUJ magnitude change corresponding with the previously discussed dual-Dirac model 202. Accordingly, oscillation issues in the CDR 416 feedback loop are not present using this model. In addition, test DUJ 702 following defined uniform probability distribution 602 correlates well with measured DUJ in implemented transceiver systems, allowing for more accurate system characterization and testing.

Other embodiments of the invention will be apparent to those skilled in the art from consideration of the specification and practice of the invention disclosed herein. It is intended that the specification and examples be considered as exemplary only, with a true scope and spirit of the invention being limited only by the following claims.

What is claimed is:

1. A method of testing a clock and data recovery circuit, the method comprising:

generating a jitter signal including data-uncorrelated jitter having a defined probability distribution;

generating a jitter-free data signal;

phase modulating the jitter-free data signal by the jitter signal to generate a phase modulated signal; and measuring a bit lock acquisition time of the clock and data recovery circuit to achieve bit lock of the phase modulated signal.

2. The method of claim 1, wherein said jitter signal further includes random jitter.

3. The method of claim 2, wherein said random jitter has specified standard deviation and mean values.

4. The method of claim 2, wherein said random jitter has a Gaussian probability distribution.

5. The method of claim 1, wherein said jitter signal further includes sinusoidal jitter.

6. The method of claim 5, wherein said sinusoidal jitter has specified frequency ranges.

7. The method of claim 1, wherein the defined probability distribution is a uniform probability distribution.

8. The method of claim 1, wherein the jitter-free data signal is a data signal having periodic data patterns.

9. A system for testing a clock and data recovery (CDR) circuit, the system comprising:

a data signal generator configured to generate a jitter-free data signal;

one or more noise signal generators configured to generate a jitter data signal;

a phase modulator in communication with the data signal generator, the CDR circuit and the one or more noise signal generators;

a test signal output from the CDR circuit;

a test signal input to the CDR circuit; and a detector system in communication with the data signal generator and the CDR circuit, configured to measure a bit lock acquisition time of the CDR circuit by using the jitter-free data signal and the test signal output;

wherein one of the noise signal generator generates data-uncorrelated jitter having a defined probability distribution, and wherein the phase modulator modulates the jitter-free data signal by the jitter data signal to generate the test signal input.

10. The system of claim 9, wherein one of the noise signal generators is a sinusoidal signal generator.

11. The system of claim 9, wherein one of the noise signal generators is a Gaussian noise generator.

* * * * *